United States Patent Office 3,803,247
Patented Apr. 9, 1974

3,803,247
PROCESS FOR RECOVERY OF USEFUL
COMPONENTS FROM PHENOL TARS
David N. Glew and John E. Ollerenshaw, Sarnia, Ontario, and Ernest A. Somers, Delta, British Columbia, Canada, assignors to The Dow Chemical Company, Midland, Mich.
No Drawing. Filed Dec. 13, 1972, Ser. No. 314,790
Int. Cl. C07c 37/24
U.S. Cl. 260—621 A                                12 Claims

ABSTRACT OF THE DISCLOSURE

A tar fraction produced during the conversion of an aryl monocarboxylic acid to an aryl hydroxy compound with a copper-containing catalyst is extracted with a dilute aqueous aliphatic carboxylic acid to recover valuable components from the tar. In particular, more copper is recovered for recycle to the aryl hydroxy compound producing reactor.

BACKGROUND OF THE INVENTION

U.S. Pat. 2,727,926, 2,764,587 and 2,852,567 disclose processes for converting, in the presence of steam, certain aromatic monocarboxylic acids to the corresponding phenolic compounds, using cupric salts or oxides as a "catalyst," with or without a promoter. The latter can be a magnesium, sodium, potassium, cobalt, lithium or barium salt or oxide.

In the course of the above reaction, some tars are formed. The tars comprise polymeric substances of unknown composition in admixtures with unreacted aromatic carboxylic acid, copper compounds, and compounds formed by the promoter.

Prior art procedures for recovering valuable components from the tars formed during the conversion of aryl carboxylic acids are either complex, or they use comparatively large quantities of chemicals or they are deficient in that recovery of desirable components is low.

U.S. Pat. 2,954,407 describes a process in which the tar is extracted with from 0.5 to 5 volumes of water at 100°–175° C. In this procedure, high proportions of the unreacted aromatic carboxylic acid are recovered but only 66 to 74% of the copper is extracted.

The procedure in U.S. Pat. 3,130,235 employs a mixture of immiscible solvents—a water-miscible alcohol for extraction of the unreacted aromatic carboxylic acid, copper and magnesium salts, and phenol—a water-immiscible and alkanol-immiscible solvent or dispersant for extraction of the polymeric substance. The two immiscible layers are separated and the respective water-miscible alkanol and the immiscible solvent are recovered by distillation for reuse. Although this process is efficient for recovery of components, it is quite expensive and requires much accessory equipment, such as stills, heat exchangers and storage facilities.

In U.S. Pat. 3,349,134, the process described consists of adding a condensed ring aromatic compound either to the mixture undergoing reaction or to the tar after reaction, and then extracting the valuable unreacted components with water.

U.S. Pat. 3,356,744 describes a process for recovering up to 80% of the copper in the tar by first subjecting the tar to an oxidizing treatment and then extracing with water. During this procedure, oxygen is consumed and carbon dioxide is liberated.

U.S. Pat. 3,365,503 describes a process in which the tar is first heated with steam at 150°–300° C. and then extracted with an alkanol or a ketone containing up to 4 carbon atoms. After extraction, the organic solvent is separated and the residue is recycled to the reactor. This procedure is satisfactory for recovery of unreacted benzoic acid, but is poor for copper recovery.

SUMMARY OF THE INVENTION

This invention relates to the method of extracting valuable components from tars which are formed during the preparation of aromatic hydroxy compounds by the catalytic oxidation of aromatic monocarboxylic acid, in the presence of steam, with or without oxygen, comprising, extracting the tar, either before or after a water extraction step, with a dilute aqueous solution of an aliphatic carboxylic acid. If desired, two or more extraction cycles can be performed on the tar.

The sources of the tars which are extracted according to this invention are reactions which are amply described in U.S. Pats. 2,727,926 (or its Reissue No. 24,848), 2,852,567 and 2,764,587. These patents describe batch and continuous procedures wherein an aromatic carboxylic acid, having at least one unsubstituted carbon atom in the ring adjacent to the ring carbon atom carrying the carboxyl group, is catalytically converted to a hydroxyl containing derivative (a phenol) by an oxidative decarboxylation of the acid. After reaction the phenolic OH group is attached to the carbon atom adjacent to that which carried the COOH group. The reaction is effected at an elevated temperature in the range of 200°–400° C., in the presence of steam, preferably in the presence of small amounts of oxygen. The catalyst is a cupric salt or oxide, preferably promoted with a salt or oxide of Mg, Na, K, Co, Li or Ba.

Representative aromatic carboxylic acids which are converted to phenols include benzoic, o-toluic, m-toluic, p-toluic, m-nitrobenzoic, p-nitrobenzoic, p-chlorobenzoic, p-methoxybenzoic, p-phenyl benzoic, 2,4-dimethyl benzoic, 1-naphthoic, 2-naphthoic, 8-nitro-1-naphthoic, 4-methyl-1-naphthoic, 5-bromo-2-naphthoic, 4-carboxy-pyridine, nicotinic, quinaldic, cinchoninic, 7-quinoline carboxylic, quinolinic, 2 - methyl-6-carboxyquinolne, or 6-nitro-3-carboxyisoquinoline acids. Salts, anhydrides and esters of these acids can also be converted to the o-phenols by the process.

The catalysts and promoters when used should preferably be soluble in the reaction mixture or be readily convertible to compounds which are soluble therein.

DETAILED DESCRIPTION OF THE INVENTION

It has been found that the valuable aromatic carboxylic acids and copper catalyst can be extracted from tars which are formed during the catalytic oxidative decarboxylation of aromatic monocarboxylic acids by mixing from about 1 to about 5 weight parts of a dilute aquous aliphatic carboxylic acid with 1 part by weight of untreated reactor tars or tars which have been previously extracted with water, until substanial equilibrium is reached and separating the aqueous phase from the tar phase. Preferably, the aqueous aliphatic acid phase is recycled to the phenol reactor, but, if desired, the phenol, aromatic acid and catalyst can be concentrated by distilling off the extractant water and aliphatic carboxylic acid.

The aliphatic acids which are useful include all acids which are soluble to an extent of at least about 0.5% and preferably to at least about 9.5 weight percent in water. The preferred aliphatic acids are saturated and contain 1 to 4 carbon atoms. More preferred are the 2–4 carbon atom alkanoic acids. Most preferred is acetic acid. Aqueous formic acid is a good copper extractant, but on recycle to the phenol process, it would be oxidized in the presence of copper and, therefore, if it is employed, the valuable components are preferably separated from the aqueous phase without recycle. Acetic, propionic and butyric acids are not oxidized appreciably on recycle and thus are preferably used, because they can be readily recovered from the aqueous phase of the phenol reaction system for reuse in the tar-extraction process.

The concentration of the aliphatic acid in water can range from about 0.5 to about 80 weight percent. The upper limit of acid concentration is not determined by the ability of the acid to extract copper and the desired organic constituents from the tar, but by the ability to achieve phase separaion of the polymeric tar from the aqueous acid.

The preferred alkanoic acid concentration ranges from about 1 to about 10 weight percent in water, preferably 3 to 9.5%. The most preferred acetic acid concentration ranges from about 3 to about 5 weight percent in water.

The proportions of the aqueous alkanoic acid to liquid reaction mixture can range from about 1:1 to about 5:1 by volume, with a preferred range of from about 1.5 to 2 parts of aqueous acid per part of reaction mixture. As the ratio of aqueous acid to liquid reaction mixture is reduced below 1:1, the separation of tar and aqueous acid phases becomes progressively more difficult. At a ratio above 5:1, the increased quantities of recycled dilute aqueous alkanoic acid causes evaporative overloading of the phenol reactor.

It is to be understood that the concentration of acid in the aqueous extraction liquid and the proportion of aqueous liquid to tar can be varied in a manner such that the density of the aqueous phase is sufficiently lower than that of the tar phase to permit phase separation on standing. Thus, if a single acid concentration for extraction is desired, a series of tests using a standard weight of tar and varying weight ratios of the aqueous acid can be run. The mixture is stirred and, preferably, air or oxygen is fed to the system, while heating to the desired temperature and pressure. After about 5-20 minutes, the stirring is stopped and heat is removed. The test flask can be cooled by external means, if desired. The weight ratio of aqueous acid to tar in which two phases form are operative. On the other hand, it is also possible to determine the operative aqueous acid concentration, by following the above procedure but using a single weight ratio of aqueous acid to tar and determining the acid concentration at which two phases are formed. A third and more preferable alternative is to vary the weight ratio of aqueous acid to tar and the acid concentration at each ratio. If the last mentioned procedure is used, it is possible to optimize the acid concentration and its ratio to tar for extracting the aromatic acid and copper salts.

The temperature at which the extraction is effected can range from about 90° to about 160° C. Below 90° C., the tar is solid and is difficult to extract, except by resort to long extraction periods. Above about 160° C., the vapor pressure of the aqueous acid becomes troublesome. The preferred extraction temperature ranges from about 120° to about 140° C.

The pressure of the extraction system is not critical, but it must exceed the vapor pressure of the two phase tar-aqueous acid system to prevent boiling. The absolute pressure must exceed 15 p.s.i. at 90° C., 35 p.s.i. at 120° C. and 75 p.s.i. at 150° C.

The mixing or contact time for the extraction of copper from the tar-containing liquid reaction mixture must be sufficient to obtain equilibrium between the polymeric tar and the aqueous aliphatic acid phase. This depends on the mixing vessel configuration, rate of stirring and efficiency of stirrers. In operation, the mixing period can range between about 2 and about 10 minutes.

Settling time for separating the aqueous liquid and tar phases must be sufficient to allow the upper aqueous phase to become substantially free of any significant quantity of suspended tar. Preferably, the quantity of tar is less than 1% and more preferably less than 0.5%. In operation, the settling period can range from about 10 seconds to about 20 minutes. If desired, means for facilitating separation of the phases, such as centrifuging, can be used.

The examples which follow are intended to illustrate, but not to limit, the invention. Parts and percentages are by weight unless otherwise indicated.

EXAMPLE 1

According to the procedure described in U.S. Pat. Re. 24,484, a plant-scale phenol process reactor was charged with a mixture of benzoic acid, cupric benzoate and magnesium oxide; the mixture was heated to about 230° C. and streams of air and steam were introduced near the bottom of the reactor and bubbled upward through the liquid reaction mixture at the above temperature. Gases and volatile reaction products passed from the top of the reactor to a product recovery system where the desired phenol product was separated and purified. In the course of operation, benzoic acid was continuously fed into the phenol reactor while liquid reaction mixture was continuously drawn off. The liquid reaction mixture withdrawn contained about 15 percent by weight of polymeric tar, 2.5 percent of magnesium benzoate, and 0.8 percent of copper. This liquid reaction mixture was continuously transferred to a vessel which contained a stirrer. It was mixed under pressure of about 45 p.s.i. absolute with about 1.7 parts by weight of aqueous 3.25 weight percent acetic acid at about 130° C. Stirring was continued until the composition of the aqueous extractant was in equilibrium with the composition of the reaction mixture (about 10 minutes). The mixture of aqueous acetic acid, benzoic acid, copper salts and polymeric tars was transferreed to a settling vessel where the polymeric tars sank to the bottom and were drawn off. The supernatant aqueous extract, containing as a soluble copper salt, about 90 percent of the copper originally present in the reactor liquid charged to the extraction process, was returned to the phenol reactor. The acetic acid extractant passed from the top of the reactor with the volatile reaction products to a recovery system where it was separated and recycled to the extraction process. The copper content of the polymeric tar drawn off from the settling vessel was found to be 0.38 weight percent and the benzoic acid content was 12%.

When the above procedure was repeated using water as extractant for the reaction mixture, the copper content of the tar was found to be 0.8 weight percent and only about 80 percent of the copper originally present in the reactor liquid was returned to the phenol process reactor. The separated tar contained about 14 percent benzoic acid.

In the procedure of this example, both the liquid reaction mixture and the aqueous acetic acid were fed to the mixer near the top and withdrawn from the bottom. It is apparent, however, that counter-current extraction by feeding the aqueous acetic acid near the bottom of the mixer and withdrawing the acid after extraction, through the reactor top, and feeding the liquid reaction mixture near the top of the mixer and withdrawing the tarry material from the bottom of the mixer is also contemplated.

EXAMPLE 2

In this and subsequent examples, the apparatus used consisted of a two section, flanged glass reactor. The bottom section was tapered inwardly at its lower half and had an outwardly projecting flange at its top surface. The upper section had an outwardly projecting flange at its lower extremity which cooperated with the flange of the bottom section to form a seal. The upper section also had an air inlet which projected below the lower extremity of the upper section and extended well into the bottom section of the reactor. The top of the upper section was connected to a condenser. At the top of the condenser was a bearing for a stirrer, which extended to the bottom of the assembled reactor. An outlet for uncondensed gases was provided above the condenser.

A series of runs was made to determine the miscibility-separation properties of mixtures of an unextracted tar and aqueous acetic acid. In each instance 7 grams of tar was mixed with various quantities of acetic acid at three concentration levels. The runs were made at 100° C. with stirring for 9 minutes and an air flow of 5.4 ml. per minute. Tabulated below are observations and data of the several runs.

| Run No. | Wt. acetic acid, g. | Acetic acid conc., weight percent | Comments |
| --- | --- | --- | --- |
| 1 | 12 | 18.3 | No visible separation (25 min.). |
| 2 | 24 | 18.3 | No visible separation (20 min.). |
| 3 | 34 | 12.9 | Phase separation (3 min.). |
| 4 | 12 | 9.4 | No visible phase separation (14 min.). |
| 5 | 21 | 9.4 | Phase separation (30 seconds). |

These data show that both acid concentration and ratio of aqueous acid to tar have effects on phase separation. It is apparent that if 18.3% acetic acid is to be used, as an extractant, the tar-aqueous acid ratio must be higher than 7 to 24. At 12.9% acid concentration a ratio of 7 to 34 is operable. At 9.4% acid concentration a tar-acid ratio of 7 to 21 is satisfactory, but a 7 to 12 ratio is not.

EXAMPLE 3

The tar in the runs of this example had been extracted with hot water. It contained a means of 0.65 weight percent copper. The runs were made with varying weights and concentrations of acetic acid, at various contact times and with single and multiple extraction cycles. All extractions were made at the boiling temperature of the mixture with an air or oxygen flow of 5.5 ml. per minute. Data taken during the runs are tabulated below.

For the purpose of comparison the same procedure as that described above was used using 12 g. of 21.6 weight percent aqueous HCl as an extractant. After 4.5 minutes only about 19.8% of the copper present in the tar was recovered in the aqueous phase.

Other aliphatic acids described above are as effective as acetic acid for extracting valuable components from the tars in the liquid reaction product produced in the catalytic oxidative-decarboxylation of aromatic acids.

We claim:

1. A method of extracting valuable components including copper compounds and aromatic monocarboxylic acids from the tar formed during the catalytic oxidative-decarboxylation of said aromatic monocarboxylic acid, to form phenolic compounds in the presence of steam, with or without the presence of oxygen, the improvement comprising mixing the tar fraction with an aqueous solution of a $C_1$-$C_4$ alkanoic carboxylic acid, said solution containing from about 0.5 to about 80% by weight of the said alkanoic acid, in a ratio of from about 1 to 5 parts of said solution of alkanoic acid to 1 part of tar, the concentration of said acid and the said ratio being such as to form two phases in the mixture, on standing up to about 20 minutes at a temperature of from about 90° to about 160° C., for a time sufficient to effect equilibrium between the tar phase and aqueous aliphatic acid phase, and separating the two phases.

2. The method of claim 1 in which the alkanoic acid contains 2–4 carbon atoms, and in which the extractant is recycled to the reactor in which the oxidative decarboxylation of the aromatic monocarboxylic acid is being effected.

3. The method of claim 1 in which liquid reaction mixture is continuously withdrawn from the oxidative-decarboxylation reactor and is continuously mixed with from about 1 to about 5 weight parts of said solution of alkanoic acid.

| Number | Wt. acid, g. | Percent wt. acid | Air flow ml./min. | Contact time, min. | No. of extractions | Copper in raw tar, percent | Copper in treated tar, percent | Copper removed, percent |
| --- | --- | --- | --- | --- | --- | --- | --- | --- |
| 1 | 12.0 | 9.4 | 5.5 | 4.5 | 1 | 0.650 | 0.459 | 29.4 |
| 2 | 12.0 | 18.3 | 5.5 | 4.5 | 1 | 0.650 | 0.270 | 58.5 |
| 3 | 12.0 | 18.3 | 5.5 | 9.0 | 1 | 0.650 | 0.319 | 50.9 |
| 4 | 12.0 | 29.9 | 5.5 | 9.0 | 1 | 0.650 | 0.305 | 53.1 |
| 5 | 12.0 | 29.9 | 5.5 | 9.0 | 1 | 0.650 | 0.325 | 50.0 |
| 6 | 12.0 | 40.0 | 5.5 | 4.5 | 1 | 0.650 | 0.338 | 52.0 |
| 7 | 12.0 | 49.9 | 5.5 | 4.5 | 1 | 0.650 | 0.298 | 54.2 |
| 8 | 12.0 | 79.7 | 5.5 | 4.5 | 1 | 0.650 | 0.288 | 55.7 |
| 9 | 12.0 | 18.3 | ¹5.5 | 60.0 | 1 | 0.650 | 0.290 | 55.4 |
| 10 | 24.0 | 18.3 | 5.5 | 4.5 | 1 | 0.650 | 0.384 | 40.9 |
| 11 | 12.0 | 18.3 | 5.5 | 4.5 | 2 | 0.650 | 0.215 | 66.9 |
| 12 | 12.0 | 18.3 | 5.5 | 4.5 | 4 | 0.650 | 0.137 | 78.9 |

¹ Pure oxygen used.

These data show that a 7 to 12 tar to acid weight ratio of 18.3% acetic acid at 4.5 minutes contact time is about as effective a combination of conditions for a single extraction cycle as any other combination of tar-acid and ratios, contact times, and that increasing acid concentrations to 29.9, 40, 49.9 and 79.7 weight percent did not shift the equilibrium concentrations of copper to any great extent. The data also show that with 18.3% acid equilibrium is established within about 4.5 minutes and that increasing contact time does not result in extraction of more copper. Multiple extractions result in increased removal of copper from the tar, but as the number of extractions increase the total amount of copper removed per extraction tends to decrease e.g. at equilibrium the second and all succeeding extractions tend to have progressively lower copper concentrations in the liquid phase.

4. The method of claim 1 in which ratio of the solution of alkanoic acid ranges from about 1.5 to about 2.5 parts by weight per part of liquid reaction product removed from the reactor.

5. The method of claim 4 in which acetic acid is the alkanoic acid.

6. The method of claim 1 in which acetic acid is the alkanoic acid.

7. The method of claim 4 in which propionic acid is the alkanoic acid.

8. The method of claim 1 in which propionic acid is the alkanoic acid.

9. The method of claim 1 in which butyric acid is the alkanoic acid.

10. The method of claim 4 in which butyric acid is the alkanoic acid.

11. The method of claim 2 in which the alkanoic acid is acetic acid in a weight concentration of from about 3 to about 5%, the ratio of said alkanoic acid solution to the liquid reaction mixture removed from the oxidative decarboxylation reactor is from about 1.5 to about 2 parts per part of said liquid reaction mixture, the contact time is from about 2 to about 20 minutes and the temperature is from about 120° to about 140° C.

12. The method of claim 11 in which the acetic acid solution fed to the oxidative-decarboxylation reactor wherein it is vaporized and passes from the reactor, is condensed, recovered and recycled to the extraction steps of said claim 11.

References Cited

UNITED STATES PATENTS

| | | | |
|---|---|---|---|
| 3,365,503 | 1/1968 | Forni et al. | 260—621 G |
| 3,349,134 | 10/1967 | Blom et al. | 260—621 G |

BERNARD HELFIN, Primary Examiner

N. MORGENSTERN, Assistant Examiner

U.S. Cl. X.R.

260—289 R, 297 R, 525, 613 D, 620, 622 R, 623 R, 627 H; 423—24

PO-1050
(5/69)

UNITED STATES PATENT OFFICE
CERTIFICATE OF CORRECTION

Patent No. 3,803,247          Dated April 9, 1974

Inventor(s) David N. Glew; John E. Ollerenshaw; Ernest A. Somers

It is certified that error appears in the above-identified patent and that said Letters Patent are hereby corrected as shown below:

Column 1, line 65, delete the word "extracing" and insert --extracting--.

Column 2, line 39, delete "carboxyquinolne" and insert --carboxyquinoline--.

Column 2, line 52, delete "aquous" and insert --aqueous--.

Column 2, line 55, delete "substanial" and insert --substantial--.

Column 3, line 10, delete "separaion" and insert --separation--.

Column 4, line 10, delete "24,484" and insert --24,848--.

Column 4, line 33, delete "transferreed" and insert --transferred--.

Column 4, line 35, insert --process-- after the word "phenol".

Column 5, line 30, delete "means" and insert --mean--.

Column 6, line 26, delete "aliphatic" and insert --alkanoic--.

Column 8, line 3, delete "Forni" and insert --Galliate--.

Signed and sealed this 10th day of September 1974.

(SEAL)
Attest:

McCOY M. GIBSON, JR.          C. MARSHALL DANN
Attesting Officer              Commissioner of Patents